US006845566B1

(12) United States Patent
Clements et al.

(10) Patent No.: US 6,845,566 B1
(45) Date of Patent: Jan. 25, 2005

(54) ROTATING FEELER GAGE

(75) Inventors: Marvin W. Clements, Portsmouth, RI (US); Paul E. Moody, Barrington, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/672,963

(22) Filed: Sep. 29, 2003

(51) Int. Cl.[7] .............................. G01B 3/20; G01B 3/50

(52) U.S. Cl. ................................ 33/501.08; 33/501.45; 33/542

(58) Field of Search ......................... 33/501.45, 501.08, 33/501.05, 501.06, 542, 544, 544.1, 567, 613, 600, 832–833, 602; 114/201 R

(56) References Cited

U.S. PATENT DOCUMENTS

| | | | | | |
|---|---|---|---|---|---|
| 1,656,180 A | * | 1/1928 | Eisele | 33/542 |
| 2,901,829 A | * | 9/1959 | Lucas | 33/567 |
| 2,903,797 A | * | 9/1959 | Hackwood | 33/501.45 |
| 3,319,339 A | * | 5/1967 | Marconi | 33/832 |
| 4,004,538 A | | 1/1977 | Schoonman | |
| 4,388,782 A | | 6/1983 | Rodgers et al. | |
| 4,466,551 A | | 8/1984 | Leung | |
| 4,534,135 A | | 8/1985 | Wilger et al. | |
| 4,930,226 A | * | 6/1990 | Shindelar | 33/655 |
| 4,945,651 A | * | 8/1990 | Georg | 33/832 |
| 5,038,600 A | * | 8/1991 | Friedman | 33/502 |
| 5,144,753 A | * | 9/1992 | Murphy | 33/514 |
| 5,288,292 A | * | 2/1994 | Giraud et al. | 33/512 |
| 5,421,224 A | * | 6/1995 | Bond | 81/436 |
| 5,562,065 A | | 10/1996 | Duarte et al. | |
| 5,592,747 A | * | 1/1997 | Kessler | 33/783 |
| 6,397,486 B1 | * | 6/2002 | Keys et al. | 33/522 |

* cited by examiner

*Primary Examiner*—Diego Gutierrez
*Assistant Examiner*—Yaritza Guadalupe
(74) *Attorney, Agent, or Firm*—James M. Kasischke; Michael P. Stanley; Jean-Paul Nasser

(57) ABSTRACT

A feeler gage including a pin member having a first end and an opposing end with a gage connected to the opposing end of the pin member. The gage has a first end connected to the pin and a free end projecting past a peripheral dimension of the pin. An indicator is formed on the first end of the pin member in alignment with a longitudinal axis of the gage for determining a position of the gage upon rotation of the pin member. The gage is of a predetermined thickness and is aligned with the indicator formed at the first end of the pin member. Rotation of the pin member correspondingly rotates the gage of the pin member. If the gage rotates freely, then a gap is determined to be present in the area where the gage is rotated through. If the gage does not rotate freely, then no gap exists.

5 Claims, 5 Drawing Sheets

ROTATING FEELER GAGE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention generally relates to a gage. More particularly, the invention relates to a feeler gage, which can effectively and economically measure the gap between a watertight hatch and its seat, when the assembly is subjected to submergence pressure.

(2) Description of the Prior Art

The current art for gages in connection with a submarines pressure hatch is normally designed with eight lugs, which extend beyond its gasket-sealing surface. The hatch is mated to a locking ring, which has similar lugs on its interior. When the locking ring is in one position, the hatch can open and close freely. However, if the locking ring rotates 22.5 degrees, the lugs on the locking ring cover the rings on the hatch and prevent it from opening. In addition, the locking ring itself is connected to its foundation by a threaded connection. Therefore, when the locking ring rotates, its moves axially. This results in the locking ring not only blocking the possibility of the hatch opening but it also pulls it firmly against its seat area. This is important to effect a tight seal when the assembly is subjected to sea pressure as well as holding the assembly securely, should it be subjected to a shock load.

However, whenever a submarine hatch assembly is subjected to submergence pressure it deflects in response to the loads induced by the pressure. Accordingly, there is a problem in the art wherein this deflection becomes greater as pressures increase. In addition, there is the potential for this deflection to actually lift the hatch off its gasket seat. If this occurs there is the possibility of the gasket extruding between the hatch and the seat area. If an excessive deflection occurs the assembly may leak. If the gasket extrudes between the hatch and its seat area then there is also the potential to pinch the gasket as the pressure causing component deflection, abates.

Therefore, it is very important to know how big a gap will result from pressurization so that a proper gasket design can be developed to match operating conditions. While this information can be obtained analytically, there is a need to validate the calculations prior to going to sea or implementing a design fix to a fleet problem. Presently, there is no method to measure the gap resulting from component deflections. This disclosure reveals an economical and effective method with the use of a feeler gage in order to determine this gap under either a test or an operating condition.

The following patents, for example, disclose various types of hatch covers, but do not disclose the use of an inexpensive feeler gage for determining a gap between a gasket seat and a hatch.

Specifically, Schoonman (U.S. Pat. No. 4,004,538) discloses a wave responsive hatch cover locking and sealing mechanism. In the mechanism, wave impact closes normally open contacts on a marine vessel hatch cover face to initiate or to increase fluid pressure within a collapsible hollow gasket interposed at the interface between a hatch cover and a deck hatchway to lock the hatch cover to the hatchway and to effect a watertight seal therebetween.

Rodgers et al. (U.S. Pat. No. 4,388,782) discloses a grinder for preparing circular seats behind elliptical handholes of marine boilers. An air motor, mounted within an expandable housing, drives a grinding wheel against the inside surface of the handhole. The housing is expanded to be secured in the elliptical handhole. The center of the motor orbits on a circle about the center of the housing so that a circular seat is formed about the inside edge of the elliptical handhole.

Leung (U.S. Pat. No. 4,466,551) discloses a releasable closure device adapted to provide sealing engagement between abutting surfaces by means of a rotatable locking ring comprising a plurality of locking lugs adapted to frictionally engage recessed locking channels disposed in the surfaces.

Wilger et al. (U.S. Pat. No. 4,534,135) discloses a machine provided for in-situ grinding of tapered lugs on a hatch, such as a hatch aboard a submarine. A base is provided and a device is attached to alternate lugs of the hatch for mounting the base across the hatch opening. An elongated plate is mounted at its center to the base for pivotal movement thereon. The pivotal plate has opposite ends wherein each end is extendable between a pair of alternate lugs, one of the lugs between one of the pair of lugs being a lug to be ground. A device is mounted on the base for oscillating the pivotal plate back and forth between the lugs of each pair of alternate lugs. A grinder is provided, and a device is utilized for mounting the grinder at one end of the pivotal plate for selectively engaging the grinder with or backing the grinder away from the lug to be ground. With this arrangement a lug can be ground by oscillating the pivotal plate and engaging the grinding means with the lug.

Duarte et al. (U.S. Pat. No. 5,562,065) discloses an elastomeric pump including a rigid outer housing defining an outer chamber and having a fluid inlet thereinto. The pump further includes an inner housing disposed within the outer housing. The inner housing is provided with rigid walls and first and second expandable members, the first expandable member having greater elasticity than the second expandable member, the rigid walls and expandable members defining an inner chamber. A fluid conduit extends from the inner chamber to the exterior of the outer housing. A rigid cage is fixed to the inner housing and is disposed over the first expandable member, and is configured to permit and limit expansion of the first expandable member.

It should be understood that the present invention would in fact enhance the functionality of the above patents by providing a feeler gage selectively inserted into an opening formed between a gasket seat and a seating surface of a hatch in a hatch-locking ring assembly as illustrated in the preferred embodiment of the present invention.

SUMMARY OF THE INVENTION

Accordingly, it is a general purpose and primary object of the present invention to provide a gap-measuring gage.

It is a further object of the present invention to provide a gap-measuring gage for increasing a gap that is not accessible for direct insertion of a feeler gage.

It is a still further object of the present invention to provide a gap-measuring gage for a hatch-locking ring assembly.

It is a still further object of the present invention to provide a feeler gage for a hatch-locking ring assembly in which the feeler gage is inserted into a gap formed between a gasket seat and a hatch of the assembly.

It is a still further object of the present invention to provide a feeler gage for a hatch-locking ring assembly in which the feeler gage can detect the presence or absence of a gap in seal of the assembly.

It is a still further object of the present invention to provide a feeler gage for a hatch-locking ring assembly in which the feeler gage can detect the presence or absence of a gap between a gasket seat and a hatch portion of the assembly.

To obtain the objects described, there is provided a feeler gage including a pin member having a first end and an opposing end with a gage connected to the opposing end of the pin member. The gage has a first end connected to the pin and a free end projecting past a peripheral dimension of the pin. An indicator is formed on the first end of the pin member in alignment with a longitudinal axis of the gage for determining a position of the gage upon rotation of the pin member. The gage is of a predetermined thickness and is aligned with the indicator formed at the first end of the pin member. Rotation of the pin member correspondingly rotates the gage of the pin member. If the gage rotates freely, then a gap is determined to be present in the area where the gage is rotated through. If the gage does not rotate freely, then no gap exists.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

In general, the present invention is directed to a gage, and more particularly to a feeler gage for measuring a gap between a watertight hatch and its seat, when a hatch-locking ring assembly is subjected to submergence pressure.

Figure 1:
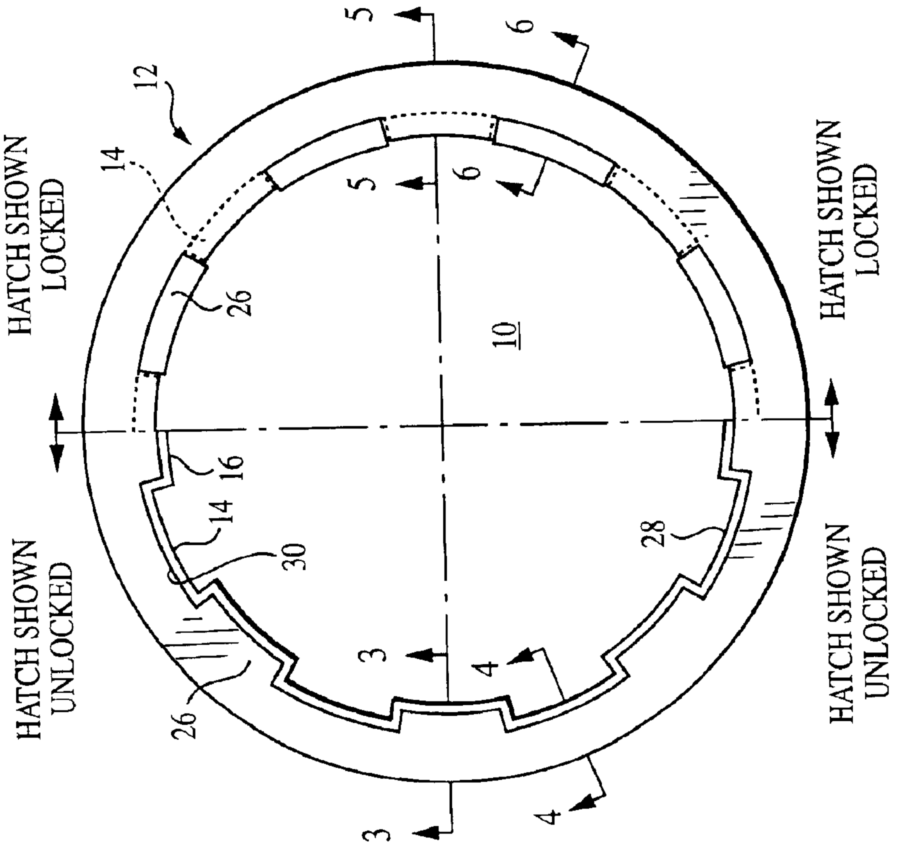
FIG. 1 is a top plan view of a typical hatch and hatch-locking ring assembly known in the art.

Turning now to the drawings, wherein like numerals refer to like elements throughout the several views, FIG. 1 reflects a typical hatch-locking ring arrangement. While the subject matter shown here in FIGS. 1 through 6 illustrating the configuration of a hatch-locking ring arrangement is correctly characterized as Prior Art, the description thereof will be included in connection with the detailed description of the preferred embodiment, since the invention operates in connection with this particular type of hatch-locking ring arrangement.

Accordingly, FIG. 1 generally illustrates a hatch 10 and a locking ring 12. The hatch 10 includes a plurality of lugs 14 protruding at intervals therefrom around an outer circumference 16 of the hatch 10. The interval nature of the lugs 14 correspondingly define recessed notches therebetween around the outer circumference 16 of the hatch 10.

The locking ring 12 includes a plurality of protruding lugs 26 spaced around an inner circumference 2B thereof. Likewise, a plurality of recessed notches 30 are interspaced between the plurality of protruding lugs 26. The plurality of hatch lugs 14 correspond in spacing to that of the plurality of locking ring lugs 26.

The right side of FIG. 1 depicts the locking ring 12 rotated such that it captures the lugs 14 of the hatch 10. The left side of FIG. 1 depicts how the lugs 14 of the hatch 10 fit within the recessed notches 30 of the locking ring 12 prior to its rotation.

Figure 2:
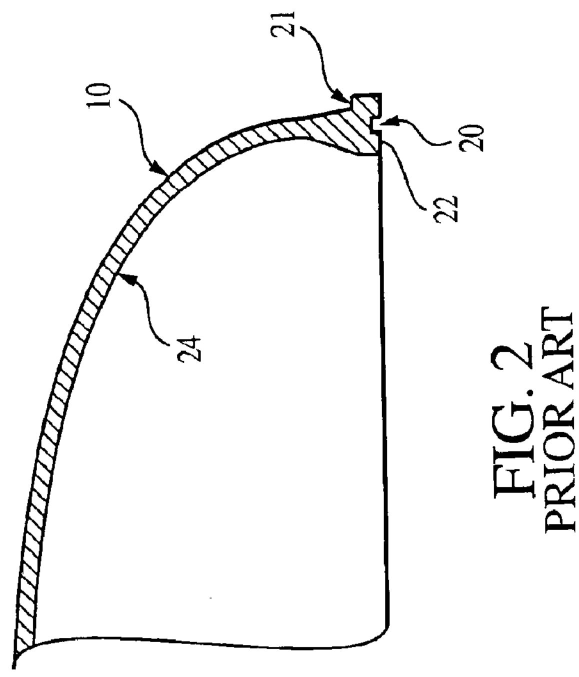
FIG. 2 is a sectional view of the hatch in FIG. 1.

When the hatch 10 is viewed as a section in FIG. 2, a gasket groove 20 is seen in primary ring 21 and a seating surface 22 of the hatch 10 with the body portion of the hatch shown as an elliptical head portion 24. The purpose of the gasket groove 20 is to retain a sealing gasket, and with the elliptical head portion 24 being a pressure containing dished configuration.

Figure 3:
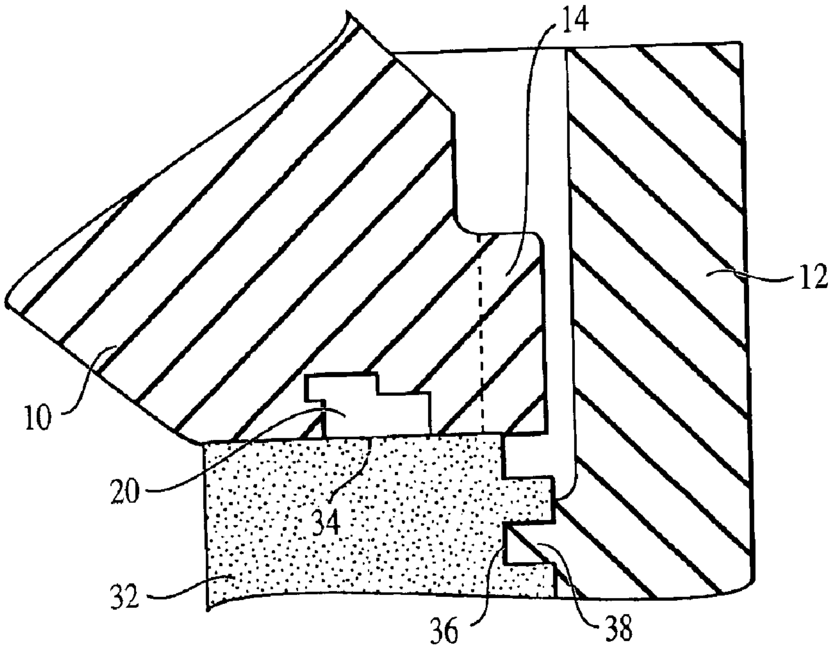
FIG. 3 is a sectional view of a typical hatch and hatch-locking ring assembly in an unlocked position with the view taken along line 3—3 of FIG. 1.
Figure 4:
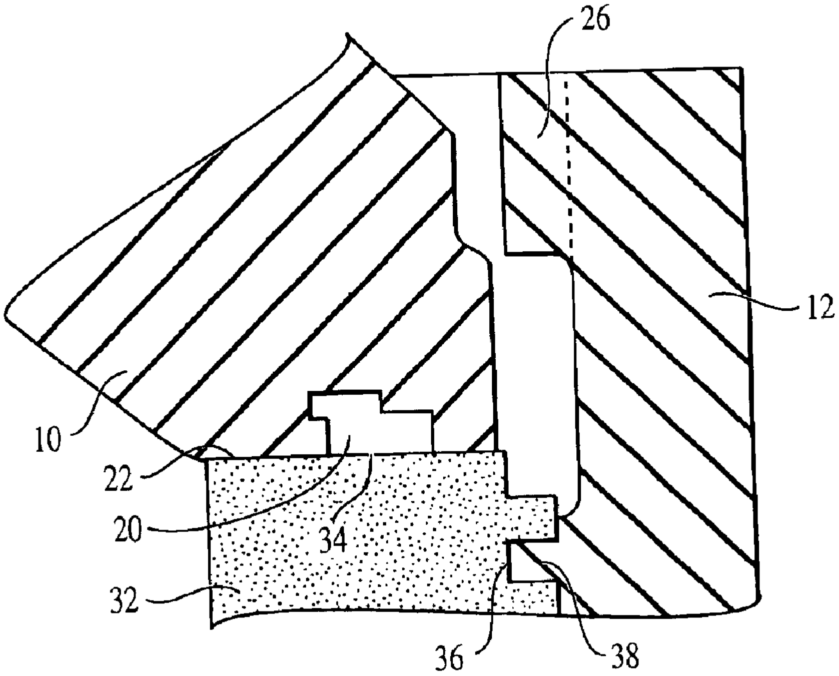
FIG. 4 is a sectional view of a typical hatch and hatch-locking ring assembly in an unlocked position with the view taken along line 4—4 of FIG. 1.

Each of FIGS. 3, 4, 5, and 6 depict additional detail of the hatch-locking ring arrangement and features which contribute to sealing of the hatch-locking ring arrangement. In particular, there is provided a gasket 32 having a surface 34 against which the hatch 10 seals. The surface 34 includes a peripheral groove 36 for receiving a corresponding lip 38 of the locking ring 12. FIGS. 3 and 4 depict the configuration reflected by the left side of FIG. 1 (the unlocked position of the hatch-locking ring arrangement); while FIGS. 5 and 6 reflect the configuration on the right side of FIG. 1 (the locked position of the hatch-locking ring arrangement).

FIG. 3 depicts the area where one of the plurality of the lugs 14 of the hatch 10 are free to lift out of the locking ring 12. FIG. 4 depicts the area where the locking ring lug 26 exists, however there is no hatch lug 14 to be entrapped.

Figure 5:
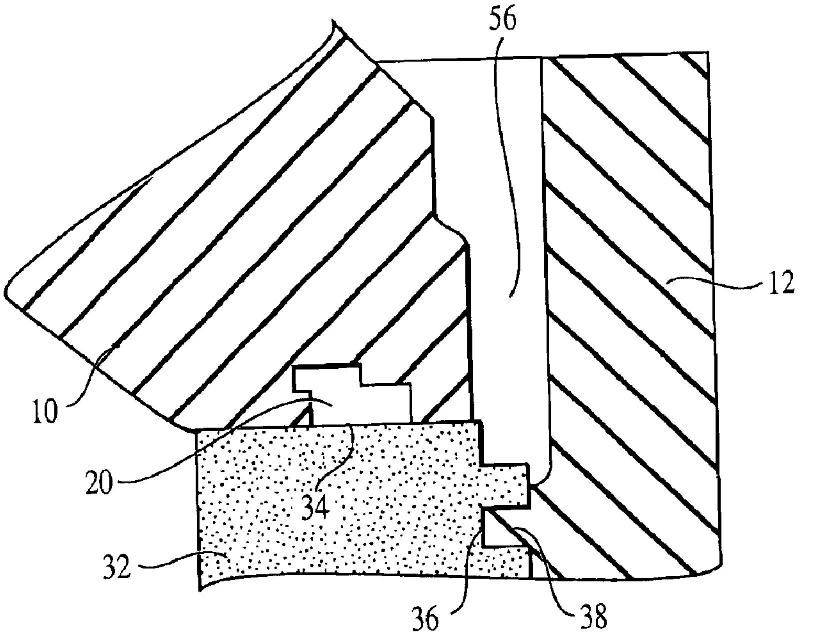
FIG. 5 is a sectional view of a typical hatch and hatch-locking ring assembly in a locked position with the view taken along line 5—5 of FIG. 1.
Figure 6:
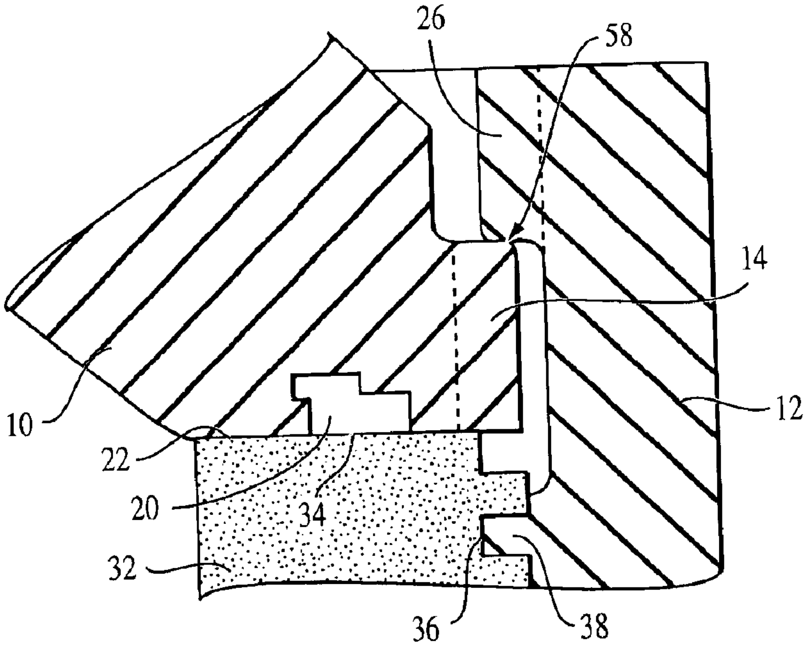
FIG. 6 is a sectional view of a typical hatch and hatch-locking ring assembly in a locked position with the view taken along line 6—6 of FIG. 1.

FIG. 5 illustrates that once the locking ring 12 is rotated to the locked position, the area 56 where both hatch 10 and locking ring 12 have no lugs 14 or 26 that match each other while FIG. 6 illustrates that in this position, the hatch lug 14 engages with the locking ring lug 26 at 58 to prevent lifting the seating surface 22 of the hatch 10 from its seated position against the surface 34 of the gasket 32.

Figure 8:
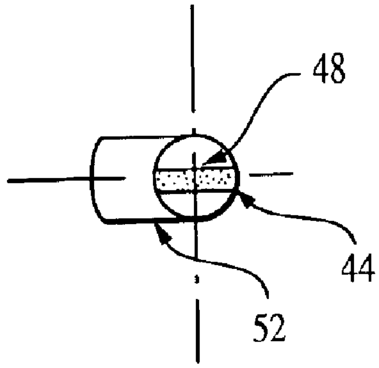
FIG. 8 is a top view of the feeler gage of the present invention with the view taken along line 8—8 of FIG. 7.
Figure 7:
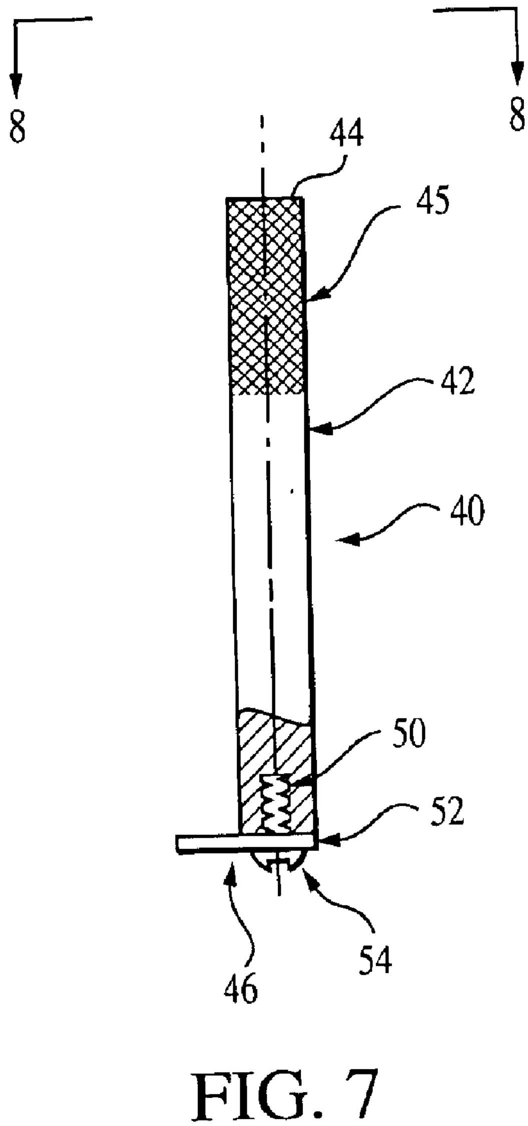
FIG. 7 is a side view of the feeler gage of the present invention.

FIGS. 7 and 8 depict the feeler gage 40 of the present invention in detail. As shown in FIGS. 7 and 8 the feeler gage 40 includes a pin 42 having a first end 44 and an opposite end 46. The pin 42 includes a knurled or gripping portion 45 adjacent the first end 44 thereof. A scribe mark 48 is formed in the first end 44 of the pin 42 and a tapped hole 50 is formed in the opposite end 46 of the pin 42. A gaging protrusion 52 is connected to the opposite end 46 of the pin 42 by an attachment screw 54 or similar securement member into the tapped hole 50.

The gaging protrusion 52 of the feeler gage 40 is of a length greater than the diameter of the pin 42 so that a portion of the gaging protrusion 52 is visible from the top view of the pin 42 as shown in FIG. 8. The gaging protrusion 52 can be of varying thicknesses and lengths determined according to a given use.

As indicated, the gaging protrusion 52 is attached to the tapped end 46 of the pin 42 so that the longitudinal axis of the gaging protrusion 52 lines up with the scribe mark 48.

Figure 9:
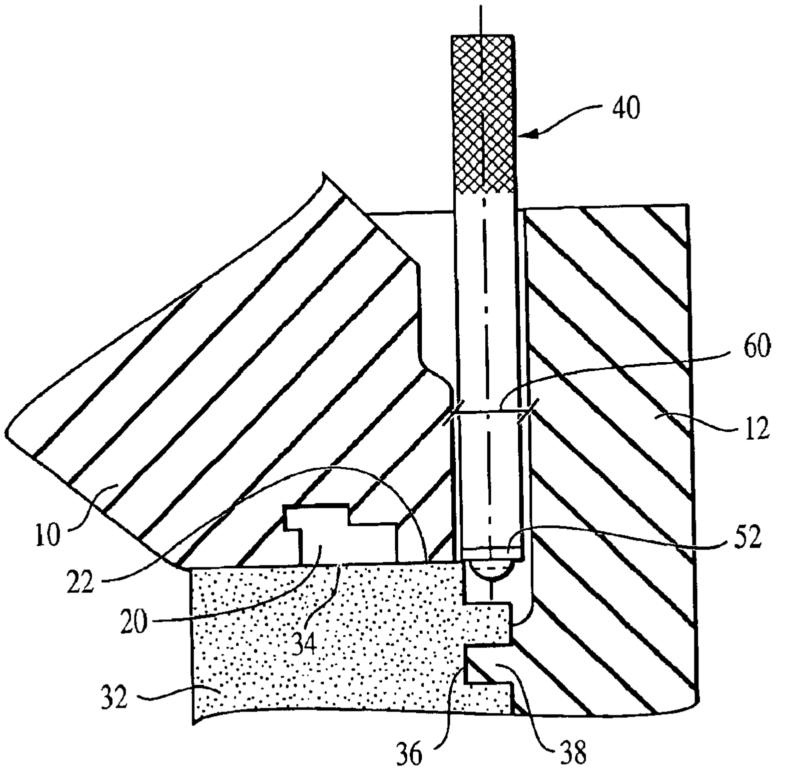
FIG. 9 is a sectional view of the feeler gage of the present invention inserted into the hatch-locking arrangement assembly of FIG. 5.

FIG. 9 shows that the gaging protrusion 52 can be pre-rotated to maneuver in the gap 60 between the hatch 10 and the locking ring 12 in the area where the lugs 14, 26 do not exist. Both FIG. 9 and FIG. 10 correlate to FIG. 5 where the hatch-locking ring arrangement is in its closed position.

Figure 10:
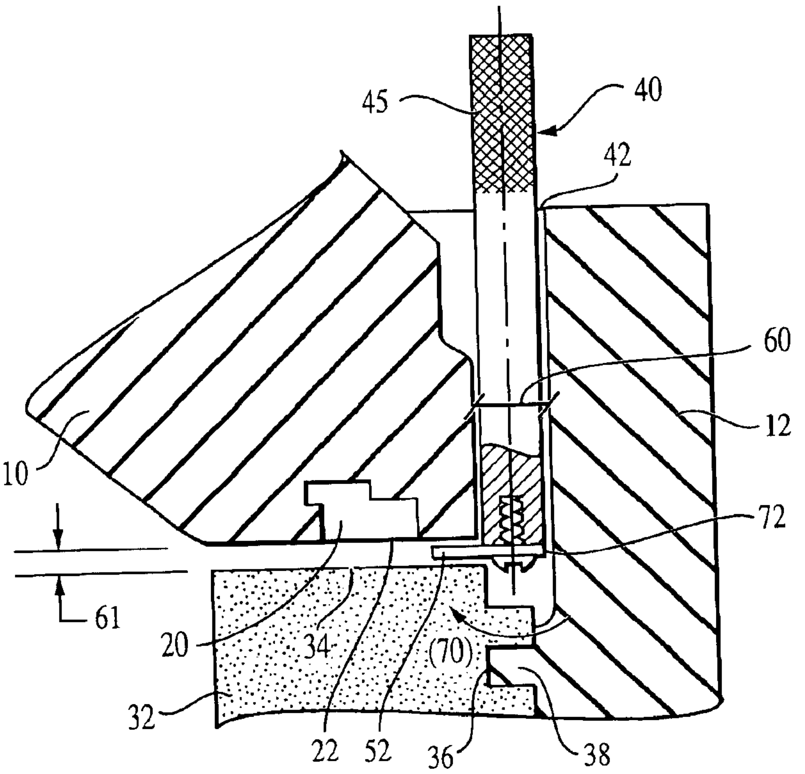
FIG. 10 is a sectional view of a rotated feeler gage of the present invention inserted into the hatch-locking ring arrangement of FIG. 5.

Referring again to FIG. 4 it can be seen that it would not be possible to rotate the feeler gage once in the gap 60 as the gaging protrusion 52 could not slide between the seating surface 22 and the surface 34. However, as components of the hatch-locking ring arrangement start to deflect, a gap 61 will occur as illustrated by FIG. 10. It is then possible to rotate the feeler gage and its gage member 52 by engaging the gripping portion 45 and turning the pin 42. By trial and error based on an arc of rotation 70 of the gaging protrusion 52, to a rotating end point 72, a deflection of the gap 61 between the hatch 10 and locking ring 12 is measurable. A test pressure based upon predetermined factors is correlated with the thickness of the gaging protrusion 52 fit between the surface 34 and the seating surface 22 of the hatch 10.

If the gap 61 becomes so large that the gasket within groove 20 extrudes into it, (therefore blocking rotation of the gaging protrusion 52 of the pin 42) then a special purpose, higher durometer gasket may be used to prevent extrusion, while a test is being conducted.

In addition, the gaging protrusion 52 is connected to the pin 42 so that it mechanically aligns with the scribe mark 48. It is anticipated that a number of pins will be manufactured and marked with a permanently attached gage thickness. Therefore, a set of gages could be used to determine gap spacing without the necessity of attaching and replacing various thickness gages on the same pin. This is a viable option due to the low cost associated with pin manufacture.

In operation, the pin 42 having the gage protrusion 52 thereon is rotated so as to be placed in the gap 60 formed between the locking ring 12 and the hatch 10. When there are pressure fluctuations affecting the hatch-locking ring arrangement, the pin 42 is turned so that the gage protrusion 52 passes between the surface 34 and the seating surface 22 of the hatch 10. If the thickness of the gage portion 52 is such that it can pass between the gasket seat 34 and the seating surface 22 of the hatch 10, determinations such as pressure fluctuations are deduced according to the thickness of the gage portion 52 being used.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. A combination of a feeler gage with a hatch-locking ring arrangement for a measurement therein, said combination comprising:

a locking ring having a plurality of lug members projecting from an inner peripheral surface thereof, and spaced to form corresponding notched recesses therebetween;

a hatch member engageable with said locking ring and having a plurality of hatch lug members projecting from an outer peripheral surface thereof, and spaced to form corresponding notched recesses therebetween, wherein rotation of said locking ring with respect to said hatch enables superposition of said locking ring lugs with corresponding ones of said hatch lugs; and a gasket seat connected to said locking ring, said hatch seated on said gasket seat;

wherein an opening is defined by a space between said hatch and said locking ring when said lugs of said hatch are superposed with said lugs of said locking ring thereby allowing said feeler gage to be inserted in the opening and rotatable for the measurement therein.

2. The combination according to claim 1 wherein said feeler gage comprises:

a pin having a first end and an opposite end;

a gaging protrusion connected to the opposite end with a free end projecting past a peripheral dimension of said pin; and an indicator formed on the first end in alignment with a longitudinal axis of said gaging protrusion for determining a position of said gaging protrusion upon rotation of said pin.

3. The combination according to claim 2 wherein said pin further includes a gripping portion adjacent the first end thereof.

4. The combination according to claim 3 wherein said indicator is a scribe line formed at the first end of said pin.

5. The combination according to claim 2 wherein said indicator is a scribe line formed at the first end of said pin.

* * * * *